…

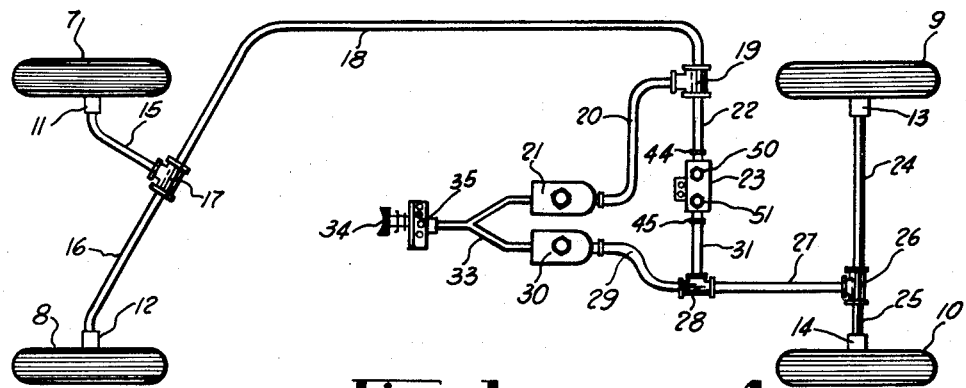

United States Patent Office 2,937,502
Patented May 24, 1960

2,937,502
EQUALIZING MEANS FOR HYDRAULIC BRAKE SYSTEM

Roy E. Kenyon, 12146 Washburn Ave., Detroit, Mich.

Filed Apr. 13, 1959, Ser. No. 806,103

1 Claim. (Cl. 60—54.5)

This invention relates to hydraulic brake systems for automotive vehicles and the like, and has particular reference to a split system and a device for equalizing pressure in such a system.

An object of the invention is to provide a device of the character indicated, which will serve as a safety factor in a hydraulic system, in the event of the failure of a master or slave cylinder, or a leak in a hydraulic line.

Another object of the invention is to provide a hydraulic brake system, with a device of the character indicated, so that the system will always have braking capacity.

Another object of the invention is to provide a hydraulic brake system, with a device, which will automatically compensate for loss of fluid pressure in the system, due to wear and the like.

Another object of the invention is to provide a pressure equalizer for a hydraulic brake system, which can be combined with a system operated either manually, or by power.

The foregoing and other objects and advantages will become more apparent as the description proceeds, reference being made from time to time to the accompanying drawing, forming part of the within disclosure, in which drawing:

Fig. 1, is a diagrammatic view of a hydraulic brake system, in which is employed a device embodying the invention.

Fig. 2, is an enlarged detail, in elevation, illustrating the equalizer embodying the invention.

Fig. 3, is a right end view of the device illustrated in Fig. 2.

Fig. 4, is a section taken substantially on the line 4—4 of Fig. 3.

Referring now more particularly to the drawing, it will be understood that in Fig. 1, I illustrate a hydraulic system for a motor vehicle having rear wheels 7 and 8, and front wheels 9 and 10, each of which wheels is controlled by hydraulically operated brakes through the slave cylinders 11, 12, 13 and 14, as in conventional practice, except that in this embodiment the slave cylinders 11 and 12 are connected to the hydraulic lines 15 and 16, which are connected as at 17, to the line 18, which in turn is connected as at 19, to a line 20, which leads to a master cylinder 21, and a line 22, which connects to the equalizer 23. The slave cylinders 13 and 14 controlling the front wheels 9 and 10, are connected through the hydraulic lines 24 and 25 and the fitting 26, to the hydraulic lines 27, which in turn, is connected, as at 28, to a line 29, which connects to a second master cylinder 30, and a line 31, which is connected to the opposite end of the equalizer 23. The two master cylinders 21 and 30 are operated in common, as at 33, by a brake lever 34, which may be a direct manual operation or by means of a power booster 35. It will be seen, therefore, that I provide a split system, part of which controls the front brakes, and part of which controls the rear brakes, with the equalizer 23, interposed between the two sections of the system. The purpose of this arrangement is to insure positive braking action on either the front wheels or the rear wheels in the event of the failure of a master cylinder, or one of the slave cylinders, or a leak in one of the hydraulic lines of the system.

Previous attempts have been made to provide safety in hydraulic systems but the structures heretofore known to the public have incorporated means for mechanically operating the brakes in the event of a hydraulic failure, or means for preventing the loss of all of the fluid in the hydraulic system in the event of the failure of one of the slave cylinders, or a leak in a line serving one of said slave cylinders. Such devices heretofore known to the public had physical limitations, or would cause an uneven pressure to be exerted on the individual slave cylinders, remaining in operation in the system, so that such devices often times caused serious accidents, because the wheels on either the right, or the left side of the vehicle were braked unevenly. Such difficulties are obviated with the use of my device, as the rear wheels are controlled by one side of my system, and the front wheels are controlled by the other side of my system, so that should the system controlling the front wheel brakes fail, the system controlling the rear wheel brakes can safely bring the vehicle to a safe stop, or in the event of the failure of the system controlling the rear wheel brakes, the system controlling the front wheel brakes can safely bring the vehicle to a safe stop, without danger of having the vehicle change its direction of travel.

As previously indicated, I interpose in the system a pressure equalizer 23, consisting of a housing 37, which has an integrated flange 38, having openings 39 therein, for receiving bolts, or the like, whereby the device may be mounted to a vehicle frame (not shown). The housing 37 has central bores 40 and 41, which are threaded, as at 42 and 43, to receive the end fittings 44 and 45, and the fittings 44 and 45 have threaded openings 46 and 47 for respectively receiving the lines 22 and 21 (Fig. 1). Each bore 40 and 41 defines a compartment, which compartments are respectively provided with bleeder valves 50 and 51, so that air may be exhausted from the bores 40 and 41 after filling the system with fluid, or at any other desirable time. The bores 40 and 41 are separated by means of an inwardly directed ring, or shoulder 52, which serves as a stop for the piston heads 53 and 54, of the pistons 55, which is arranged for reciprocation in the bores 40 and 41. The piston 55 is made in two parts, so that it may be assembled on the inside of the housing 37, on opposite sides of the stop 52. The piston 55 consists of a male member 55A, and a female member 55B, which telescope one another. Each pistonhead 53 and 54 is provided with a rubber seal 56 and 57, and springs 58 and 59, which are interposed between the heads 53 and 54 and the end closure members 44 and 45 respectively. The springs 58 and 59 are intended to normally hold the piston centered in the bores 40 and 41, until there is a change of pressure on either side of the piston. Should there be a major reduction in pressure on the inside of the housing 37, the piston will move in the direction of the reduced pressure, until either the head 53, or the head 54, of the piston is brought to rest against the stop 52, in which event the pressure will be maintained on the stopped side of the piston, and the pressure in that side of the system will be sealed. Should wear of the brake shoes, or the like, on one side, or the other, of the system cause a minor differential in pressure between the two sides of the system, the piston 55 will move in the direction of the lesser pressure, until the pressure is equalized throughout the system. Such inequality of pressure caused by wear would not be sufficient to move the piston 55 in either one direction, or the other, far enough to contact the stop 52. The head 53 or head 54 of the piston 55, will only come in contact with the stop 52, in the event of a major loss of pressure, such as a failure of a cylinder, or a leak in one of the lines.

It is believed that the operation of the device is obvious from the foregoing description.

Having described my invention, what I claim, and desire to secure by Letters Patent is:

A pressure equalizing device for a hydraulic system having two master cylinders and four slave cylinders and hydraulic means for connecting said cylinders consisting of a housing having a central bore in each end, said bores being connected by a reduced passageway, the opposite ends of said bores being closed by fittings, each having means for receiving one of the hydraulic means connecting each master cylinder to its slave cylinders, and a piston in said housing, said piston having an enlarged head at either end, each head being received in one of said bores, said piston consisting of a male portion and a female portion telescoping one another, each of said portions carrying one of said enlarged heads.

References Cited in the file of this patent

UNITED STATES PATENTS

| | | |
|---|---|---|
| 1,668,730 | Pearson | May 8, 1928 |
| 1,704,762 | Reynolds | Mar. 12, 1929 |
| 2,145,114 | Gibbs et al. | Jan. 24, 1939 |
| 2,160,074 | La Brie | May 30, 1939 |
| 2,264,675 | Nardone | Dec. 2, 1941 |
| 2,266,597 | Green | Dec. 16, 1941 |
| 2,563,168 | Herriott | Aug. 7, 1951 |
| 2,736,332 | Simmons | Feb. 28, 1956 |

FOREIGN PATENTS

| | | |
|---|---|---|
| 204,878 | Australia | Dec. 14, 1956 |